United States Patent
Abu-Thabit et al.

(10) Patent No.: US 9,099,711 B2
(45) Date of Patent: Aug. 4, 2015

(54) FUEL CELL MEMBRANE

(71) Applicant: KING FAHD UNIVERSITY OF PETROLEUM AND MINERALS, Dhahran (SA)

(72) Inventors: Nedal Y. Abu-Thabit, Jubail (SA); Sayed Mohammed Javaid Zaidi, Brisbane (AU); Shaikh Asrof Ali, Dhahran (SA); Khaled Mezghani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 92 days.

(21) Appl. No.: 14/023,466

(22) Filed: Sep. 11, 2013

(65) Prior Publication Data
US 2015/0072252 A1 Mar. 12, 2015

(51) Int. Cl.
*H01M 8/10* (2006.01)
*H01M 8/02* (2006.01)

(52) U.S. Cl.
CPC .......... *H01M 8/1044* (2013.01); *H01M 8/1025* (2013.01); *H01M 8/1034* (2013.01); *H01M 8/0221* (2013.01); *H01M 8/0289* (2013.01); *H01M 8/1018* (2013.01); *H01M 8/1069* (2013.01); *H01M 8/1086* (2013.01); *H01M 2008/1095* (2013.01); *H01M 2300/0082* (2013.01); *H01M 2300/0091* (2013.01)

(58) Field of Classification Search
CPC ............ H01M 8/0221; H01M 8/0289; H01M 8/1018; H01M 8/1025; H01M 8/1034; H01M 8/1044; H01M 8/1069; H01M 8/1086; H01M 2008/1095
See application file for complete search history.

(56) References Cited

U.S. PATENT DOCUMENTS

| 6,248,469 | B1 | 6/2001 | Formato et al. |
| 7,790,837 | B2 | 9/2010 | McGrath et al. |
| 8,288,025 | B2 | 10/2012 | Manthiram et al. |
| 2009/0092880 | A1 | 4/2009 | Kim et al. |

OTHER PUBLICATIONS

Abu-Thabit, Nedal Y. et al., "Novel Sulfonated Poly(ether ether ketone)/Phosphonated Polysulfone Polymer Blends for Proton Conducting Membranes," Journal of Materials Research, 27(15), 1958-1968, Jun. 2012.*
Di Vona, M. Luisa et al., "SPEEK/PPSU-Based Organic-Inorganic Membranes: Proton-Conducting Electrolytes in Anhydrous and Wet Environments", Journal of Membrane Science 279, 186-191, 2006.
Parcero, Ethel et al., "Phosphonated and Sulfonated Polyphenylsulfone Membranes for Fuel Cell Application," Journal of Membrane Science, 285(1-2), pp. 206-213, Nov. 2006.
Di Vona, M. Luisa at al., "Analysis of Temperature-Promoted and Solvent-Assisted Cross-Linking in Sulfonated Poly(ether ether ketone) (SPEEK) Proton-Conducting Membranes", J. Phys. Chem. B, 113, 7505-7512, 2009.
Nedal Y. Abu-Thabit, Shaikh A. Ali and S.M. Javaid Zaidi, "New highly phosphonated polysulfone membranes for PEM fuel cells", Journal of Membrane Science, vol. 360, Issues 1-2, Sep. 15, 2010, pp. 26-33.
Sgreccia, E. et al., "Hybrid Composite Membranes Based on SPEEK and Functionalized PPSU for PEM Fuel Cells," International Journal of Hydrogen Energy, 36(13), 8063-8069, 2011.

* cited by examiner

*Primary Examiner* — Patrick Ryan
*Assistant Examiner* — Ben Lewis
(74) *Attorney, Agent, or Firm* — Richard C Litman

(57) ABSTRACT

The fuel cell membrane is a polymer electrolyte (or polyelectrolyte) membrane formed from a blend of sulfonated poly (ether ether ketone) (SPEEK) and phosphonated polysulfone in the ester form (PPSU-E), where the sulfonated poly(ether ether ketone) and the phosphonated polysulfone each form about 50 wt % of the polyelectrolyte membrane. The polyelectrolyte membrane is made by dissolving a mixture of SPEEK and PPSU in the ester form (PPSU-E) in dimethylacetamide (DMAc) at room temperature to form a solution. The SPEEK/PPSU-E mixture has a concentration of between about 10 wt % and about 15 wt % in the solution. The solution is then stirred and left to release air bubbles therefrom. The DMAc is then evaporated from the solution, leaving the resultant polyelectrolyte membrane, which is then washed and dried.

9 Claims, 7 Drawing Sheets

FUEL CELL MEMBRANE

BACKGROUND OF THE INVENTION

1. Field of the Invention

The present invention relates to proton exchange membrane fuel cells, and particularly to a fuel cell membrane for proton exchange membrane fuel cells formed from a blend of sulfonated poly(ether ether ketone) (SPEEK) and phosphonated polysulfone in the ester form (PPSU-E).

2. Description of the Related Art

Figure 2:
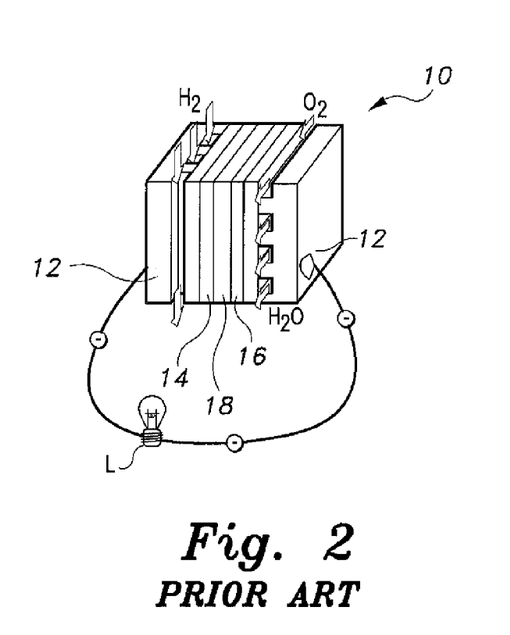
FIG. 2 illustrates a typical proton exchange membrane fuel cell according to the prior art.

Proton exchange membrane fuel cells, also known as polymer electrolyte membrane (PEM) (or polyelectrolyte membrane) fuel cells (PEMFCs), are a type of fuel cell presently being developed for transportation applications, as well as for stationary fuel cell applications and portable fuel cell applications. Their distinguishing features include lower temperature/pressure ranges (50° C. to 100° C.) and a special polymer electrolyte membrane. PEMFCs operate on a similar principle to polymer electrolyte membrane electrolysis. FIG. 2 illustrates a typical proton exchange membrane fuel cell 10. Gaseous hydrogen fuel is channeled through outer field flow plates 12 to the anode 14 (on one side of the fuel cell 10) and to the cathode 16 (on the other side of fuel cell 10). At the same time, an oxidant, such as oxygen gas or air, is channeled to the cathode 16. At anode 14, a platinum catalyst causes the hydrogen to split into positive hydrogen ions (i.e., protons) and negatively charged electrons.

The polymer electrolyte membrane (PEM) 18 allows only the positively charged ions to pass through it to the cathode 16. The negatively charged electrons must travel along an external circuit to the cathode 16 (illustrated in FIG. 2 with an exemplary simple light bulb L connected across the hydrogen flow fields 12), creating an electrical current. At the cathode 16, the electrons and positively charged hydrogen ions combine with oxygen to form water, which flows out of the cell.

Nafion®, manufactured by EL DuPont De Nemours and Company of Wilmington, Del., is a common ionomer used in proton exchange membrane fuel cells. Nafion® is a sulfonated tetrafluoroethylene-based fluoropolymer-copolymer, with its ionic properties being the result of incorporating perfluorovinyl ether groups terminated with sulfonate groups onto a tetrafluoroethylene backbone. Nafion® was found effective as a membrane for proton exchange membrane fuel cells by permitting hydrogen ion transport while preventing electron conduction. However, Nafion® dehydrates (thus losing proton conductivity) when temperatures are above ~80° C. This limitation causes problems in the design of fuel cells, because higher temperatures are desirable for a better efficiency and CO tolerance of the platinum catalyst.

Thus, a fuel cell membrane solving the aforementioned problems is desired.

SUMMARY OF THE INVENTION

The fuel cell membrane is a polyelectrolyte membrane formed from a blend of sulfonated poly(ether ether ketone) (SPEEK) and phosphonated polysulfone in the ester form (PPSU-E), where each of the sulfonated poly(ether ether ketone) and the phosphonated polysulfone form about 50 wt % of the polymer electrolyte membrane. The polyelectrolyte membrane is made by dissolving a mixture of SPEEK and phosphonated polysulfone in the ester form (PPSU-E) in dimethylacetamide (DMAc) at room temperature to form a solution. The SPEEK/PPSU-E mixture has a concentration of between approximately 10 wt % and approximately 15 wt % in the solution. The solution is then stirred and left to release air bubbles therefrom. The DMAc is then evaporated from the solution, leaving the resultant polyelectrolyte membrane, which is then washed and dried.

These and other features of the present invention will become readily apparent upon further review of the following specification.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

In a first embodiment of the fuel cell membrane, the fuel cell membrane is a polyelectrolyte membrane formed from a blend of sulfonated poly(ether ether ketone) (SPEEK) and phosphonated polysulfone (PPSU-A), where the sulfonated poly(ether ether ketone) forms between 50 wt % and 70 wt % of the polymer electrolyte membrane. The polyelectrolyte membrane is made by dissolving a mixture of SPEEK and phosphonated polysulfone in the acid form (PPSU-A) in dimethylacetamide (DMAc) at room temperature to form a solution. The SPEEK/PPSU-A mixture has a concentration of between approximately 10 wt % and approximately 15 wt % in the solution. The solution is then stirred and left to release air bubbles therefrom. The DMAc is then evaporated from the solution, leaving the resultant polyelectrolyte membrane, which is then washed and dried.

The SPEEK-PPSU blend fuel cell membrane is prepared by dissolving sulfonated poly(ether ether ketone) (SPEEK) and phosphonated polysulfone in the acid form (PPSU-A) in dimethylacetamide (DMAc) at room temperature to form a solution of SPEEK/PPSU-A having a concentration of 10-15 wt % in DMAc. As will be described in detail below, samples were prepared with SPEEK to PPSU-A ratios of 70 wt % to 30 wt %, 50 wt % to 50 wt %, and 60 wt % to 40 wt %. Although a SPEEK to PPSU-A ratio of 70 wt % to 30 wt % is preferred, it should be understood that the SPEEK concentration may be in the range of 70 wt % to 50 wt %. SPEEK has the following structure:

and PPSU-A has the following structure:

The PPSU-A was synthesized by the chloromethylation of a polysulfone backbone followed by phosphonation utilizing a Michaels-Arbuzov reaction. The degree of chloromethylation and phosphonation was controlled from 0.4 p to 2 without crosslinking side reactions. Then, the phosphonated polysulfones in the ester form were quantitatively hydrolyzed to the corresponding acid form by refluxing in aqueous hydrochloric acid (as described in Nedal Y. Abu-Thabit, Shaikh A. Ali and S. M. Javaid Zaidi, "New highly phosphonated polysulfone membranes for PEM fuel cells", Journal of Membrane Science, Volume 360, Issues 1-2, 15 Sep. 2010, Pages 26-33).

The solution of SPEEK/PPSU-A was stirred overnight and then left for 24 hours in order to release air bubbles. The solutions were poured into Petri dishes and the solvent was evaporated at 60° C. to form membranes. The formed membranes were dipped in ultra-pure deionized water for a few hours in order to release any remaining solvent. The membranes were then dried under vacuum at 90° C. for three hours and stored in ultra-pure deionized water for subsequent use as polymer electrolyte membranes, similar to membrane 18, as described above.

In order to characterize the SPEEK-PPSU blend fuel cell membranes, $^1$H NMR spectra of the blend polymers were recorded for structural characterization. Data were collected on a 500 MHz spectrometer using DMSO-$d_6$. IR spectra were recorded for the dried membranes using Fourier transform infrared spectroscopy (FTIR). 32 scans were collected for each sample in the range of 400-4000 cm$^{-1}$.

In order to study the water and methanol uptake ($W_{solvent}$), the prepared membranes were first dried under vacuum at 80° C. overnight to obtain their dry weights ($W_{dry}$) and then immersed in deionized water/pure methanol for three hours at the desired temperatures. Excess water/methanol was quickly removed from both surfaces before the weights of the swollen membranes ($W_{wet}$) were obtained. The solvent uptake was then calculated as $W_{solvent}=[(W_{wet}-W_{dry})/W_{dry}]\times 100\%$.

For the determination of ion exchange capacity of the polymer blend, the membrane in the acid form (~0.5 g) was immersed in 1M NaCl solution for three days to allow complete release of HCl from the membrane sample. Then, the released H$^+$ was back titrated with 0.1M NaOH solution using phenolphthalein as an indicator. The amount of acid equivalents per gram of dry polymer (IEC) can be calculated as:

$$IEC(\text{meq/g}) = \frac{(V_{NaOH}, \text{mL}) \times (0.1 \text{ M NaOH})}{g_{dry\ weight}}.$$

Lambda ($\lambda$) represents the average number of water molecules for each acid group (sulfonic/phosphonic). It can be calculated using the value of IEC and water uptake (WU) as:

$$\lambda = \frac{((WU/100)/18 \text{ g/mole}) \times 1000}{IEC \text{ (mmole/g)}}.$$

Thermogravimetric analysis (TGA) experiments were also performed, as will be described in further detail below. All of the prepared membranes were vacuum dried at 120° C. for at least one hour before the analysis. The samples were heated from 25° C. to 800° C. at 10° C./min under air. Additionally, the proton conductivity of the blend membranes was measured by electrochemical impedance spectroscopy (EIS). It was performed over the frequency range 0.1-1.2×10$^6$ Hz with 10 mV amplitude. A potentiostat and lock-in amplifier connected to a personal computer through a GPIB card were used to measure the impedance data. Membrane samples of around 1.5 cm×1.5 cm were neatly cut and put between the stainless steel electrodes of the conductivity cells. Before the test, all of the blend membranes were soaked in deionized water at 60° C. for 30 minutes, and the final thickness of the resultant membranes were used in calculations. The conductivity σ of the blend membranes was calculated from the impedance data using the relation σ=t/RA, where t is the thickness of the membrane, A the surface area and R is derived from the impedance data.

Methanol permeability experiments were carried out using a test cell, which included two compartments separated by the tested membrane. The volume of each compartment was 100 mL and the effective membrane area was 5.10 cm$^2$. The feeding compartment was filled with 1 M methanol solution and the permeate compartment was filled with ultra-pure water. Both compartments were continuously stirred by magnetic stir bars during permeability measurements. The methanol concentration in the permeate compartment was determined at different time intervals using a C$_{18}$ 125 A° column (3.9×300 mm). Methanol permeability (P) through the PEM was then calculated from the slope of the time-concentration curve of methanol in the permeate compartment, as expressed by P=(m×V$_B$×L)/(S×C$_A$), where m is the slope of the linear plot of C$_B$ versus t (dC$_B$/dt); V$_B$ is the volume of the permeate compartment; C$_A$ is the concentration of methanol in the feeding compartment; L is the thickness of the membrane; and S is the effective surface area of the membrane.

The morphology of the blend membranes was investigated by scanning electron microscopy (SEM) using an EDS (Energy-dispersive X-ray spectroscopy) analysis system. The specimens for the SEM were prepared by freezing the dried membrane samples in liquid nitrogen and breaking them to produce a cross-sectional fractured surface. Individual membranes were mounted on aluminum specimen stubs with double-sided carbon adhesive tape and sputter-coated with a gold layer to provide a conductive layer in order to reduce the buildup of charges on the surface of the sample. Additionally, tensile tests were conducted using a tensile instrument equipped with a 100 N load cell and pneumatic grips in accordance with ASTM D-882 standard 55. Five samples were tested for each membrane composition, and the average values of the properties were recorded. All tests were conducted at a constant grip-separation speed of 5 mm/min and a gauge length of 15 mm. The slope of the initial curve of stress versus strain was used for obtaining the modulus. The area under the stress strain curve was used to determine the toughness.

Figure 3:
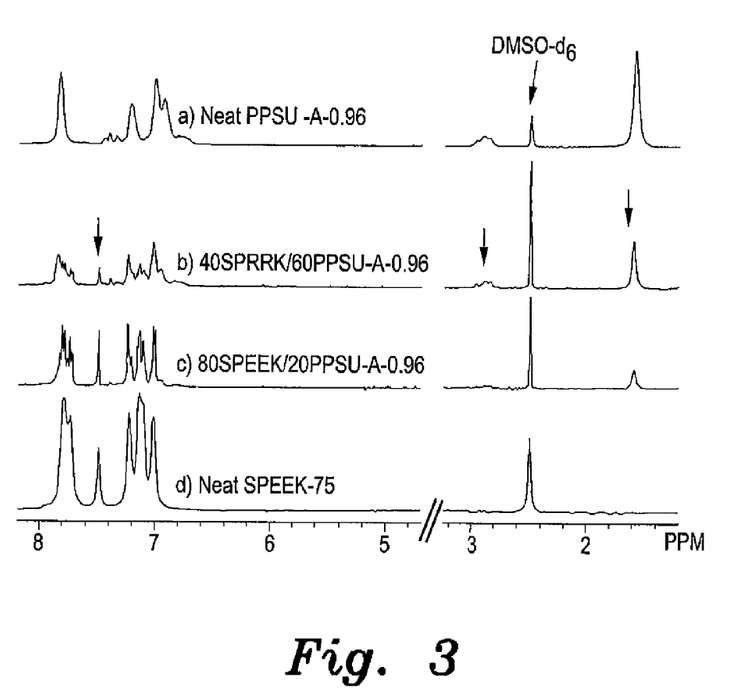
FIG. 3 is the $^1$H NMR spectra of (a) pure PPSU-A-0.96, (b) a 40SPEEK/60PPSU-A-0.96 polymer blend prepared according to the present invention, (c) an 80SPEEK/20PPSU-A-0.96 polymer blend prepared according to the present invention, and (d) pure SPEEK-75.

Different polymer compositions of SPEEK-75 (SPEEK having a degree of sulfonation [DS]=75) and PPSU-A-96 (phosphonated polysulfone having a degree of phosphonation [DP]=0.96) were dissolved in DMSO-$d_6$ and $^1$H spectra was recorded, as shown in FIG. 3. The recorded spectrum clearly shows the distinct peaks for PPSU-A-0.96 at δ 1.6 and 2.9 ppm. Likewise, the presence of SPEEK-75 was obvious from its distinct peak at δ 7.5 ppm. In FIG. 3, "neat" or pure PPSU-A-96 is shown in spectrum "a"; 40:60 and 80:20 blends of SPEEK and PPSU-A are shown in spectra. "b" and "c", respectively; and "neat" or pure SPEEK-75 is shown as spectrum "d".

Figure 4:
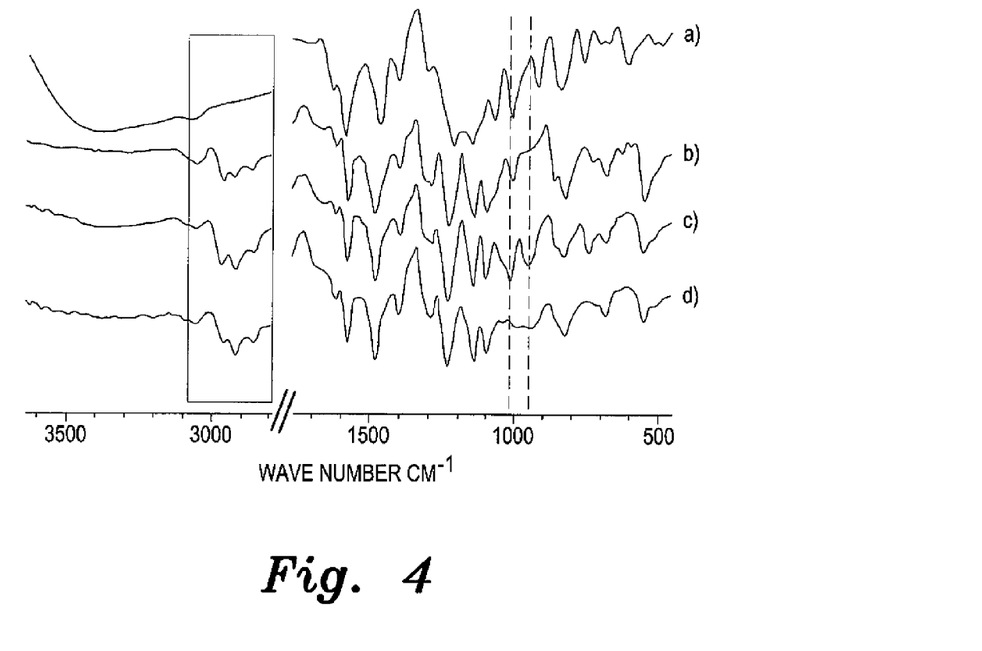
FIG. 4 is the FTIR spectra of (a) pure SPEEK (DS=75%), (b) pure polysulfone (PSU), (c) PPSU-E-0.75, and (d) PPSU-A-0.75.

FTIR spectra of SPEEK-75 and PPSU-A-96 are shown in FIG. 4. There is a clear overlap between the FTIR bands of pure SPEEK and pure PSU (polysulfone) membranes in most of their characteristic peaks, which can be attributed to the structural similarity of both polymers, (spectra "a" and "b", respectively, in FIG. 4). Comparison of the FTIR spectra of the phosphonated polysulfone in the ester form PPSU-E with the FTIR spectra of neat PSU reveals three new absorption bands at 1018, 746 and 956 cm$^{-1}$ (as shown in spectrum "c" in FIG. 4). These bands are overlapped by the SPEEK peaks in the same range. The three bands disappeared after the quantitative hydrolysis of the PPSU-Es to the corresponding acid form, PPSU-As (as shown in spectrum "d" in FIG. 4). The characteristic absorption bands at 2871, 2942 and 2965 cm$^{-1}$ (which are attributed to CH-stretching of the bisphenol-A $(CH_3)_2$ moiety of PSU, PPSU-E and PPSU-A polymers) confirm the presence of the phosphonated polymers in the blend membranes.

Figure 5:
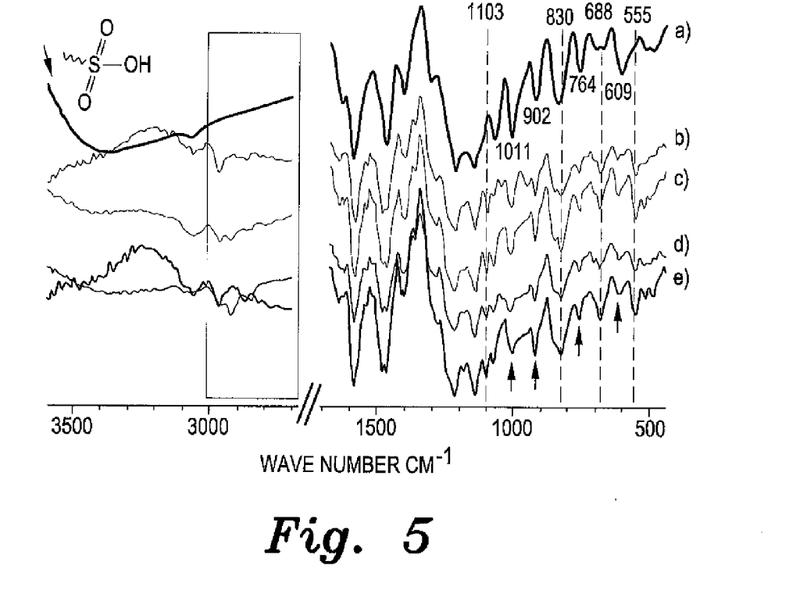
FIG. 5 is the FTIR spectra of (a) pure SPEEK (DS=75%), (b) 50PPSU-E-0.75, (c) 50PPSU-E-0.4, (d) 50PPSU-A-0.75, and (e) 50PPSU-A-0.96.

FIG. 5 shows the FTIR spectra of the pure SPEEK membrane (spectrum "a"), SPEEK/50PPSU-E-0.75 (spectrum "b") and SPEEK with 50PPSU-A-0.4, 50PPSU-A-0.75 and 50PPSU-A-0.96 blends (spectra "c", "d" and "e", respectively). Compared to pure SPEEK membranes, all phosphonated membranes in both ester and acid forms clearly display the characteristic FTIR bands in the range of 2870-2970 cm$^{-1}$. Additionally, new FTIR absorption bands for the polymer blends were observed at 1103, 830, 688 and 555 cm$^{-1}$. Furthermore, the intensity of SPEEK absorption bands in the polymer blends at 1011, 902, 764 and 609 cm$^{-1}$ is decreased.

Further, when the percentage of SPEEK polymer is above 40%, the sulfonic acid —OH stretching band around 3400 cm$^{-1}$ became invisible. This may be attributed to the high level of ionic crosslinking in the corresponding polymer blend, as well as the low concentration of free $SO_3H$ groups.

Water uptake is considered to be a critical property for membranes intended to be used as PEMFCs. There is an established relationship between the type of the acid functionality and the water uptake capability for the corresponding membrane. For example, the sulfonic acid group (PKa<1) can be easily solvated by the surrounding water molecules, causing the membrane to swell because of adequate water uptake levels. In comparison, the protons of the amphoteric phosphonic acid group ($PKa_1$_2.3 and $PKa_2$_7.6) are stabilized by self-hydrogen bonding (autoprotolysis), and as a result, phosphonic acid ionomers are known to have much lower water uptake values compared to the sulfonic acid ionomers with similar ion exchange capacity. Thus, blend membranes with mixed sulfonic and phosphonic acid functionalities are expected to show reasonable and average amounts of water uptake levels without excessive swelling of the blend membranes.

Table 1 below shows the water uptake values for the prepared blend membranes. It can be seen that the incorporation of phosphonated polysulfones reduced the water uptake levels in the blend membranes, as they became water-insoluble up to 80° C. The blend membranes showed water uptake values in the range of (15-36 wt %) at room temperature, and (14-200 wt %) at 80° C.

TABLE 1

Solvent uptake and proton conductivity values of different SPEEK/PPSU-A blend membranes

| Entry No. | Membrane code | Solvent uptake (wt %) | | Methanol | Proton conductivity (S/cm) | |
|---|---|---|---|---|---|---|
| | | Water | | | | |
| | | 25° C. | 80° C. | 25° C. | 25° C. | 80° C. |
| 1 | SPEEK-0.75 | 60 | Soluble | Soluble | 13 | 54 |
| 2 | PPSU-A-0.4 | 18 | 18 | Insoluble$^a$ | 0.05 | 0.4 |
| 3 | PPSU-A-0.75 | 27 | 28 | Insoluble$^a$ | 0.2 | 1.6 |
| 4 | PPSU-A-0.96 | 32 | 33 | Insoluble$^a$ | 0.3 | 2.5 |
| 5 | 70SPEEK/30PPSU-A-0.4 | 25 | 103 | 380 | 1.8 | 9 |
| 6 | 60SPEEK/40PPSU-A-0.4 | 20 | 50 | 290 | 0.7 | 4.4 |
| 7 | 50SPEEK/50PPSU-A-0.4 | 15 | 14 | 170 | 0.3 | 1.7 |
| 8 | 70SPEEK/30PPSU-A-0.75 | 30 | 170 | 390 | 4 | 26 |
| 9 | 60SPEEK/40PPSU-A-0.75 | 26 | 70 | 140 | 2.6 | 17 |
| 10 | 50SPEEK/50PPSU-A-0.75 | 18 | 25 | 50 | 2.1 | 11 |

TABLE 1-continued

Solvent uptake and proton conductivity values of different SPEEK/PPSU-A blend membranes

| Entry No. | Membrane code | Solvent uptake (wt %) | | | Proton conductivity (S/cm) | |
|---|---|---|---|---|---|---|
| | | Water | | Methanol | | |
| | | 25° C. | 80° C. | 25° C. | 25° C. | 80° C. |
| 11 | 70SPEEK/30PPSU-A-0.96 | 36 | 202 | 315 | 12 | 55.0 |
| 12 | 60SPEEK/40PPSU-A-0.96 | 29 | 98 | 100 | 5.5 | 50 |
| 13 | 50SPEEK/50PPSU-A-0.96 | 17 | 32 | 32 | 3.8 | 40 |

$^a$Synthesized polymers were isolated and purified by precipitation in methanol solvent This reduction in water uptake levels can be attributed to the formation of interpolymeric sulfonate-phosphonium complexes. However, when the phosphonic acid content exceeds certain limit, self-hydrogen bonding between the phosphonated polysulfones predominates, and as a result, the access of water molecules turns out to be more hindered, providing lower water uptake values for the blend membranes.

Figure 1:
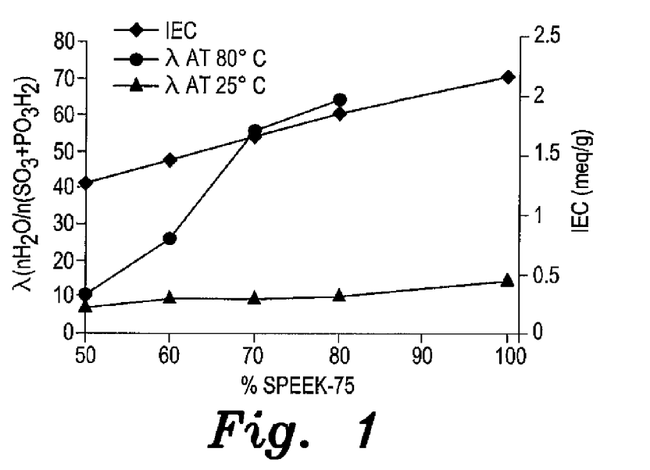
FIG. 1 is a graph showing ion exchange capacity (IEC) and lambda (λ) values for a SPEEK/PPSU-A-0.75 blend fuel cell membrane according to the present invention.

FIG. 1 shows the IEC and lambda values for the SPEEK/PPSU-A-0.75 (phosphonated polysulfone having a degree of phosphonation [DP]=0.75) blend membranes. Although the value of the IEC decreases as the percentage of the PPSU-A-0.75 increases in the polymer blend, reasonable lambda values were maintained at room temperature in the range of (8-10) water molecules per acid functionality, which may be attributed to the presence of adequate numbers of highly dissociated sulfonic acid protons in the blend membranes. When the temperature increased to 80° C., the lambda values were dramatically increased, particularly for the blends with less than 30 wt % SPEEK. Thus, the percolation threshold of lambda at 80° C. for the SPEEK/PPSU-A-0.75 blend membranes is around 40-50 wt % PPSU-A-0.75 content.

Methanol uptake values for the blend membranes are displayed in Table 1. All blend membranes were found to be insoluble in methanol at room temperature and showed methanol uptake values in the range of 32-280% of their weight. This suggests that these blend membranes may exhibit lower methanol permeability, which will be advantageous in the case of DMFC operation.

Proton conductivity generally has a strong tradeoff in its relationship with the water uptake. Membranes containing 30% phosphonated polysulfone with moderate water uptake values showed proton conductivities in the range of 1.8-12 S/cm at room temperature, and 9-55 S/cm at 80° C. (see Table 1, entries #2, 5 and 8). Unfortunately, further increases in the percentage of PPSU-A resulted in significant lowering in proton conductivities as a result of partial blocking of proton transporting channels by the formation of interpolymeric sulfonate-phosphonium complexes.

Figure 6:
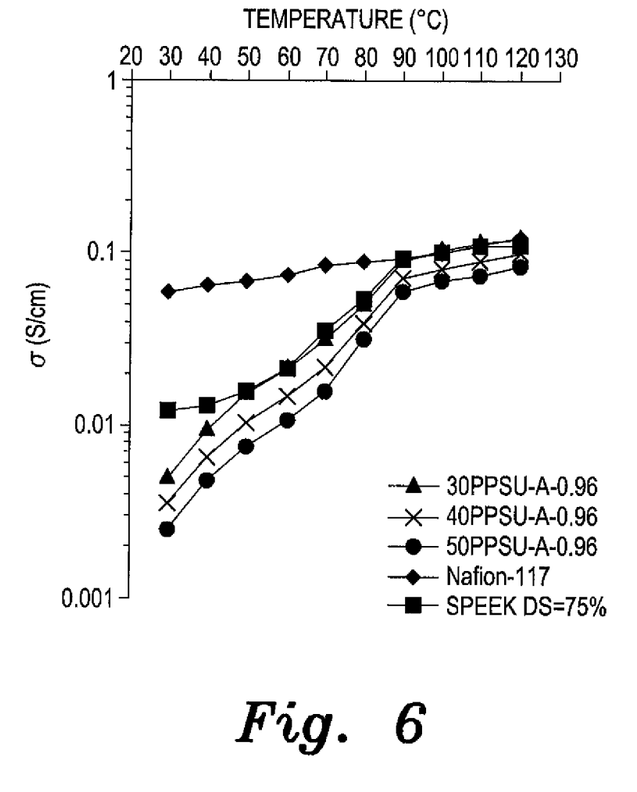
FIG. 6 is a graph comparing proton conductivities under full humidified conditions for SPEEK/PPSU-A-0.96 blend membranes formed according to the present invention having differing SPEEK to PPSU-A ratios, compared against Nafion® 117 and pure SPEEK (DS=75%) membrane samples.

Proton conductivities of the blend membranes SPEEK/PPSU-A-0.96 are shown in FIG. 6. The conductivity of SPEEK membranes increased with increasing temperature and reached about 0.098 S/cm at 100° C., which is comparable to Nafion® 117 membranes. The 30PPSU-A-0.96 blend membrane showed slightly higher proton conductivities at temperatures above 50° C. compared with the neat SPEEK membrane. This behavior continues up to 120° C. to reach a conductivity of 0.124 S/cm, which is comparable to Nafion® 117 membrane at this temperature.

The enhanced proton conductivity at temperatures above 80° C. may be attributed to the higher lambda values, as well as the improvement of water retention properties in the blend membranes through the formed ionic networks. Increasing the percentage of PPSU-A-0.96 in the blend membrane to 40% and 50% resulted in a slight decrease in proton conductivities at temperatures between 80-120° C., and the latter membranes reached proton conductivities of 0.10 S/cm and 0.094 S/em at 120° C., respectively. This reduction in proton conductivity may be attributed to the lower water uptake values of the latter membranes compared to the 30PPSU-A-0.96 membrane.

Figure 7:
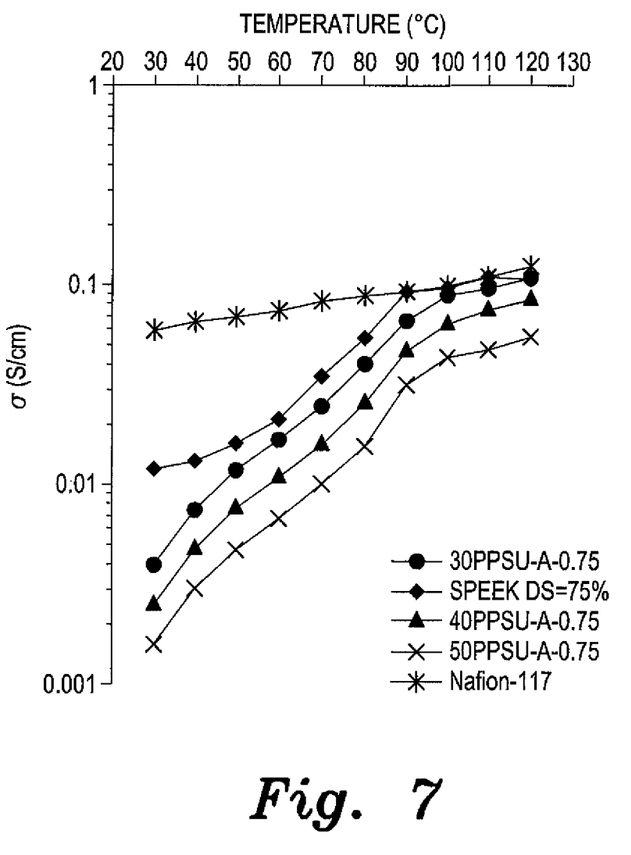
FIG. 7 is a graph comparing proton conductivities, under full humidified conditions for SPEEK/PPSU-A-0.75 blend membranes formed according to the present invention having differing SPEEK to PPSU-A ratios, compared against Nafion® 117 and pure SPEEK (DS=75%) membrane samples.

SPEEK/PPSU-A-0.75 blend membranes exhibited a proton conductivity trend similar to that of SPEEK/PPSU-A-0.96, as shown in FIG. 7. However, blend membranes with the lowest phosphonic acid functionality (40%), displayed a remarkable and significant decrease in their proton conductivities (see Table 1, entries #2-4). This could be attributed to the low levels of water uptake and the smaller number of ionic networks formed in these blend membranes.

The blend membrane with the highest proton conductivity, SPEEK/PPSU-A-0.96, was selected for methanol permeability measurements. Although pure SPEEK-75 is soluble in methanol, methanol permeability of pure SPEEK-75 is about four times lower than that of Nafion® 117. This considerably high permeability is attributed the high degree of sulfonation. Nevertheless, the SPEEK/PPSU-A-0.96 blend membranes showed slightly lower methanol permeabilities in comparison with a neat SPEEK-75 membrane, as shown below in Table 2. This behavior was expected, as the blend membranes are insoluble in methanol at room temperature.

TABLE 2

Methanol permeability data for Nafion ® 117, SPEEK DS = 75%, and SPEEK/PPSU-A-0.96 blend membranes

| Membrane Composition | Methanol Permeability (cm$^2$/s) |
|---|---|
| Nafion ® 117 | 6.80 × 10$^{-6}$ |
| SPEEK DS = 75% | 1.62 × 10$^{-6}$ |
| 30PPSU-A-0.96 | 1.30 × 10$^{-6}$ |
| 40PPSU-A-0.96 | 1.22 × 10$^{-6}$ |
| 50PPSU-A-0.96 | 1.18 × 10$^{-6}$ |

As opposed to prior SPEEK/PSU blend membranes, which are opaque, the present SPEEK/PPSU-A blend membranes containing up to 50 wt % of phosphonic acid functionalized polysulfone are transparent and resilient. SEM images showed that blending highly hydrophilic SPEEK with hydrophobic PSU resulted in poor quality and brittle membranes due to large phase separations. However, this phase separation was not observed in the SEM cross section images for the 60SPEEK/40PPSU-A-0.75 blend membrane. It is clear that the miscibility between both hydrophilic polymers was significantly improved as a result of hydrogen bonding interactions between the pendent sulfonic and phosphonic acid moieties on the poly(arylene ether) backbones.

Furthermore, SEM images of SPEEK/PPSU-A blend membranes showed interesting morphologies. Phosphonic acid functionalized polysulfones are evenly dispersed in the SPEEK/PPSU-A blend matrix, and the morphology of blend membranes showed the existence of microphases with dimensions smaller than the wavelength of visible light, on the order of 10-20 nanometers. Thus, SEM images provided further indication of the enhanced miscibility between the two polymers through the hydrogen bonding interactions.

Figure 8:
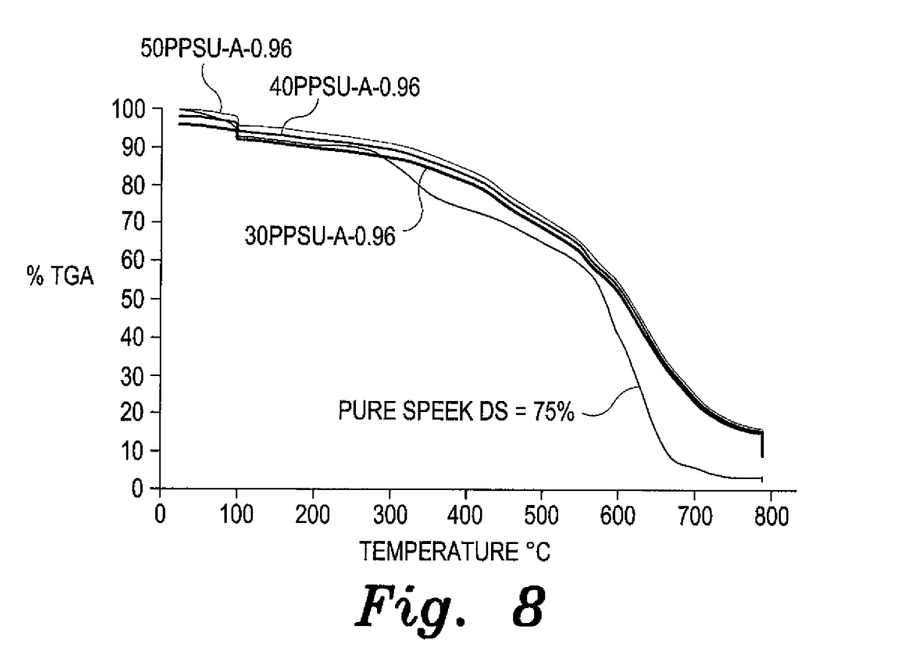
FIG. 8 shows a thermogravimetric analysis (TGA) comparison for SPEEK/PPSU-A-0.96 blend membranes formed according to the present invention having differing SPEEK to PPSU-A ratios.

FIG. 8 shows the comparison of the thermal stability behavior of a pure SPEEK membrane and the whole series of the highest proton conductivity blend membranes with PPSU-A-0.96 (i.e., containing 30, 40 and 50 wt % of PPSU-A-0.96 polymer). The pure SPEEK membrane showed a remarkable degradation in the temperature range of 250-350° C. due to the loss of sulfonic acid groups. However, all three blend membranes showed enhanced thermal stability and less weight loss in the same temperature range, which could be attributed to the formation of ionic networks between sulfonic and phosphonic acid groups. Furthermore, the blend membrane with 50% PPSU-A-0.96 exhibited the highest thermal stability in the series, which may be attributed to the formation of the highest number of hydrogen bridges between the PPSU-A-0.96 and SPEEK. Thus, thermal stability increases as the percentage of PPSU-A-0.96 increases in the blend membranes.

Figure 9:
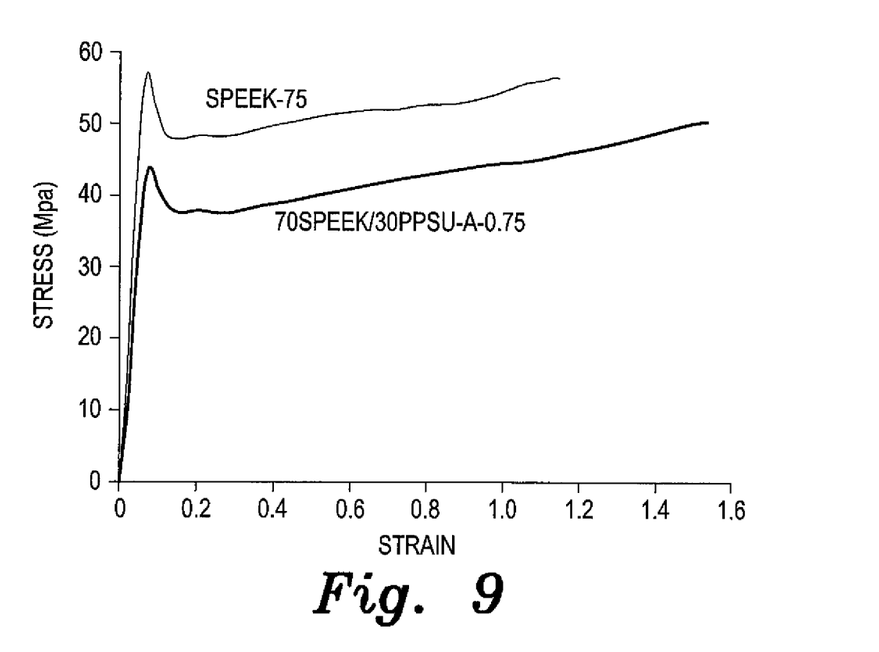
FIG. 9 is a graph illustrating a comparison of tensile strength between pure SPEEK-75 and a 70SPEEK/30PPSU-A-0.75 blend membrane according to the present invention.

To assess the effect of blending the two polymers (SPEEK and PPSU-A) on membrane reliability, a tensile test of the blend membrane 70SPEEK/30PPSU-A-0.75 was carried out, as shown in FIG. 9. The mechanical properties of the neat SPEEK-75 and the blend (70SPEEK/30PPSU-A-0.75) membranes are summarized below in Table 3. Compared to the neat SPEEK-75, the blend membrane showed a significant increase of 38% in the modulus of elasticity, 31% in yield strength, and 26% in tensile strength, as shown in Table 3.

TABLE 3

Tensile properties for SPEEK-75 and 70SPPEK/30PPSU-A-0.75 membranes

| Membrane Code[a] | Young's Modulus (MPa) | Yield strength (MPa) | Tensile Strength (MPa) | Strain at break (%) | Toughness (Mpa) |
|---|---|---|---|---|---|
| SPEEK-75 | 891 | 45 | 49 | 160 | 72 |
| 70SPEEK/30PPSU-A-0.75 | 1236 | 59 | 62 | 100 | 53 |

[a]Tests were carried out for dry membranes at room temperature

Even though reductions in the strain at break (ductility) and in the toughness were observed with the blending, the 70SPEEK/30PPSU-A-0.75 membrane showed a high ductility of 100%. This overall improvement in mechanical properties could be attributed to the formation of the intra-molecular ionic networks via hydrogen bonding interactions between the amphoteric phosphonic acid and the sulfonic acid functionalities. Improvements in mechanical properties have also been reported for acid-base ionically crosslinked membranes, such as: blends of polybenzimidazole/Nafion, polybenzimidazole/butylsulfonated polybenzimidazole, and Chitosan/sodium alginate. In addition, both SPEEK-75 and 70SPPEK/30PPSU-A-0.75 membranes showed better mechanical properties when compared to a Nafion® 117 membrane (tensile strength of 35 MPa).

In a further embodiment, SPEEK/PPSU-E blend membranes were prepared. Similar to the synthesis described above, SPEEK-0.75 was blended with different phosphonated polysulfones in their ester form (PPSU-Es) with different degrees of phosphonation, as shown below in Table 4.

TABLE 4

Properties of different SPEEK-0.75/PPSU-E blend membranes

| Entry No. | Membrane Code | Water Uptake at Room Temperature (wt %) | Water Uptake at 60° C. (Wt %) | Solubility in water at 60° C. | Proton Conductivity at 60° C. (mS/cm) |
|---|---|---|---|---|---|
| 1 | 10PPSU-E-1.5 | 55 | 78 | Stable up to 60° C. | 20 |
| 2 | 50PPSU-E-0.4 | 40 | 46 | Stable up to 60° C. | 4.5 |
| 3 | 50PPSU-E-0.75 | 38 | 45 | Stable up to 60° C. | 1.7 |
| 4 | 50PPSU-E-0.96 | 34 | 42 | Stable up to 60° C. | 1.0 |

The polyphosphonated polysulfone has the following structure in the ester form:

Although the ethyl ester of PPSU is shown, it will be understood that PPSU in the ester form may also be the methyl ester, the propyl ester, or other alkyl ester.

In the case of SPEEK/PPSU-E blend membranes, two types of ionic interactions can be identified between the two polymeric materials, namely, dipole-dipole interactions and weak hydrogen bonding interactions. Regardless of the interaction mechanism, blend membranes containing less than 50 wt % PPSU-E (not listed in Table 4 above) were found to be partially soluble in water at 60° C., except for a blend membrane made by using PPSU-E-1.5 (i.e., 150% phosphonic ester functionality, entry #1 in Table 4). Thus, blend membranes containing less than 50 wt % PPSU-E were not considered to be suitable for fabrication of low temperature fuel cell membrane (at a temperature of approximately 60° C.).

Scanning electron microscopy of a 50SPEEK/50PPSU-E-0.75 blend membrane showed that the fabricated SPEEK/PPSU-E blend membranes exhibit clear phase separation/precipitation domains. This observed phase separation is due to the weak ionic interactions (mainly dipole-dipole interactions). However, the observed phase separation in the case of SPEEK/PPSU-Es is much less than the observed phase separation in the case of SPEEK and hydrophobic polysulfone (PSU) blend membranes (SPEEK/PSU), which may be due to the improved hydrophilicity of the phosphonated polysulfones in their ester form. Thus, SPEEK/PPSU-E blend membranes with 50 wt % PPSU-E are good candidates for fabrication of low temperature fuel cell membranes.

Additionally, SPEEK/PPSU-A/PPSU-E blend membranes (i.e., membranes having SPEEK combined with both PPSU-A and PPSU-E) were prepared in order to produce membranes having greater control over water uptake and electronic conductivities, as shown in Table 5 below.

TABLE 5

Water Uptake and Electronic Conductivity of SPEEK/PPSU-A/PPSU-E Blend Membranes

| SPEEK:PPSU-A-0.96:PPSU-E-0.96 Ratio | Water Uptake (wt %) | Electronic Conductivity at 80° C. (mS/cm) |
|---|---|---|
| 50:0:50 | 42 | 1.4 |
| 50:25:25 | 38 | 22 |
| 50:50:0 | 32 | 40 |

In order to improve the mechanical properties of the blend membranes, post-treatment of the blend membranes may be carried out to introduce covalent crosslinking in the blend membranes between the different polymeric chains of SPEEK/SPEEK, PPSU-A/PPSU-A, PPSU-E/PPSU-E, SPEEK/PPSU-A or SPEEK/PPSU-E. This may be achieved by heating the blend membranes in a vacuum oven at temperatures in the range of 120-160° C. for a period of time ranging from 30 minutes up to 24 hours. This can be achieved by heating the blend membranes in a vacuum oven at temperatures of 120-160° for a period of time between 30 minutes and twenty-four hours. For example, in one case, the prepared and dried membrane (50SPEEK/50PPSU-E) was heated in a vacuum oven at 125° C. for 4 hours, and then at a temperature of 145° C. for an additional two hours.

Although the SPEEK used in all experiments had a degree of sulfonation (DS) of 75%, it should be understood that SPEEK with DS=0.5 up to DS=1.0 may be used to fabricate the blend membranes composed of sulfonated poly(ether ether ketone) and phosphonated polysulfone in their acid and/or ester forms. This allows for the fabrication of different blend membranes with fine-tuned properties in terms of water uptake and electronic conductivity at different temperatures with the minimum possible methanol permeability.

Similarly, although the PPSU-A and PPSU-E used in all experiments had degrees of phosphonation (DP) of 0.4, 0.75, and 0.96, it should be understood that phosphonated polysulfones in both acid (PPSU-A) and ester (PPSU-E) forms may be used in the range of DP=0.1 up to DP=1.0.

It is to be understood that the present invention is not limited to the embodiments described above, but encompasses any and all embodiments within the scope of the following claims.

We claim:

1. A fuel cell membrane, comprising a blend of sulfonated poly(ether ether ketone) and phosphonated polysulfone cast to form a membrane wherein the membrane consists of 50 wt % sulfonated poly(ether ether ketone), 25 wt % phosphonated polysulfone in acid form, and 25 wt % phosphonated polysulfone in ester form.

2. The fuel cell membrane according to claim 1, wherein the blend of sulfonated poly(ether ether ketone) and phosphonated polysulfone is covalently crosslinked by heating the membrane in a vacuum oven at a temperature of at least 120° C. in order to improve mechanical properties of the membrane.

3. The fuel cell membrane according to claim 1, wherein the sulfonated poly(ether ether ketone) has a degree of sulfonation between 0.5 and 1.0.

4. The fuel cell membrane according to claim 1, wherein the phosphonated polysulfone has a degree of phosphonation between 0.1 and 1.0.

5. A method of making a fuel cell membrane, comprising the steps of:
    dissolving a mixture of sulfonated poly(ether ether ketone) and phosphonated polysulfone in the ester form in dimethylacetamide at room temperature to form a solution, wherein the mixture has a concentration of between 10 wt % and 15 wt % in the solution;
    stirring the solution;
    evaporating the dimethylacetamide from the solution to form a polyelectrolyte membrane;
    washing the polyelectrolyte membrane;
    drying the polyelectrolyte membrane; and
    heating the polyelectrolyte membrane in a vacuum oven at a temperature of 125° C. for 4 hours, and then at a temperature of 145° C. for an additional 2 hours, to covalently crosslink the sulfonated poly(ether ether ketone) and the phosphonated polysulfone for mechanical strength.

6. The method of making a fuel cell membrane as recited in claim 5, wherein the sulfonated poly(ether ether ketone) and the phosphonated polysulfone each comprise about 50 wt % of the mixture.

7. The method of making a fuel cell membrane as recited in claim 6, wherein the step of stirring the solution is followed by the step of releasing air bubbles from the solution over a period of 24 hours.

8. The method of making a fuel cell membrane as recited in claim 7, wherein the step of evaporating the dimethylacetamide from the solution comprises evaporating the dimethylacetamide at a temperature of about 60° C.

9. The method of making a fuel cell membrane as recited in claim 8, wherein the step of drying the polyelectrolyte membrane comprises drying the polyelectrolyte membrane under vacuum at a temperature of about 90° C. for a period of about three hours.

* * * * *